May 26, 1959 G. W. JACKSON 2,888,273
CONTROL FOR FLUID SUSPENSION SYSTEM
Filed May 16, 1957 3 Sheets-Sheet 1
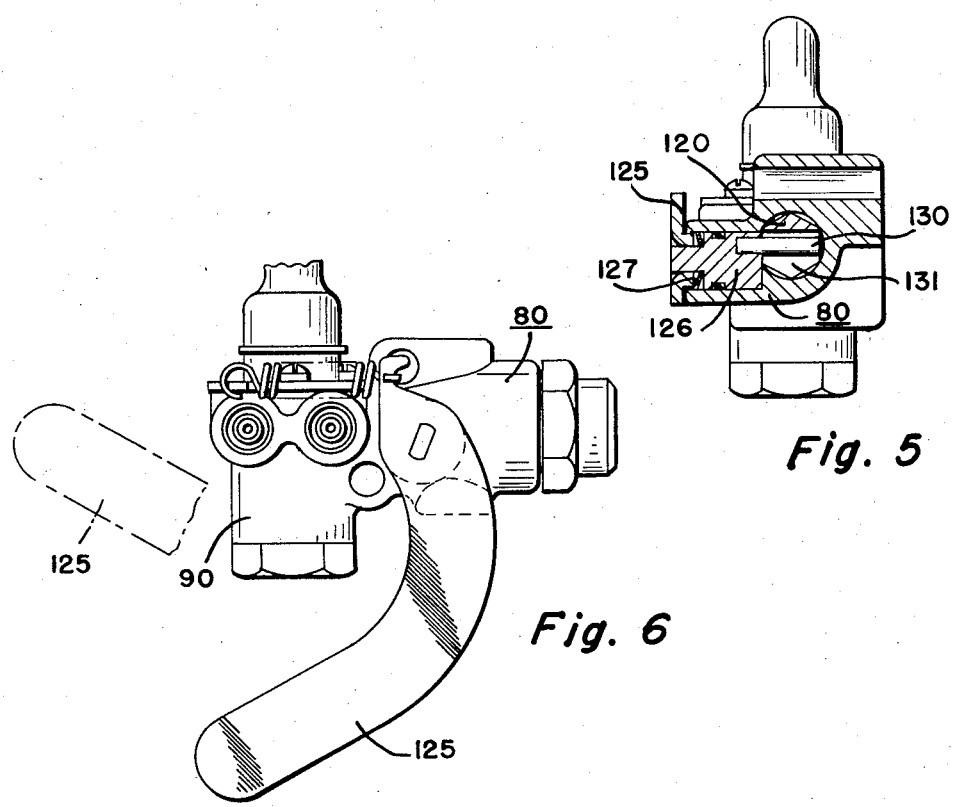
Fig. 5
Fig. 6
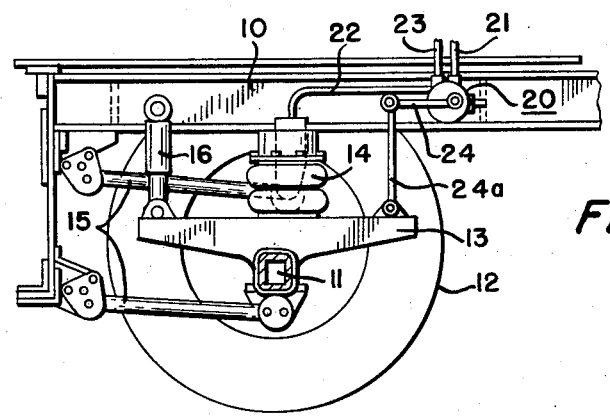
Fig. 1
INVENTOR.
George W. Jackson
BY
His Attorney May 26, 1959          G. W. JACKSON          2,888,273

CONTROL FOR FLUID SUSPENSION SYSTEM

Filed May 16, 1957          3 Sheets-Sheet 3

INVENTOR.
George W. Jackson
BY
D. C. Staley
His Attorney

United States Patent Office 2,888,273
Patented May 26, 1959

2,888,273
CONTROL FOR FLUID SUSPENSION SYSTEM

George W. Jackson, Dayton, Ohio, assignor to General Motors Corporation, Detroit, Mich., a corporation of Delaware Application May 16, 1957, Serial No. 659,708

17 Claims. (Cl. 280—124)

This invention relates to fluid suspension systems for vehicles.

Suspension systems as currently developed for motor vehicles provide a relatively low ground clearance for the vehicle in order to provide a low center of gravity in the vehicle. The static clearance height of the vehicle can be established at a predetermined minimum value relative to the load, but when a vehicle is loaded, the clearance height is considerably less than the static clearance height. On the other hand the suspension system can be designed that when the vehicle is fully loaded there is a predetermined minimum road clearance provided, but under this circumstance the clearance height or road clearance will be considerably greater when the vehicle is unloaded.

Suspension systems are under current development in which the variations in load of the vehicle are taken into account to maintain a predetermined road clearance for the vehicle regardless of whether the vehicle is loaded lightly or heavily. In fact the static road clearance for the vehicle is substantially the same as when the vehicle is fully loaded.

With ground clearance for vehicles being maintained as low as possible, difficulties are encountered occasionally when the vehicle passes over roads containing deep ruts, or the vehicle is endeavored to be placed upon lubrication racks that were designed for vehicles having considerably higher road clearances.

It is therefore desirable under some circumstances for the operator of the vehicle to have control, at least temporarily, over the road clearance provided for the vehicle, so that under certain circumstances the road clearance of the vehicle can be increased by the operator to overcome the difficulties aforementioned.

In this invention the suspension system for the vehicle includes a fluid spring that supports the sprung mass upon the unsprung mass. Preferably the fluid spring is of a bellows type adapted to receive air under pressure to establish and maintain a predetermined clearance height between the sprung mass and the unsprung mass of the vehicle. By controlling the pressure within the air spring bellows, it is possible to maintain a predetermined clearance height between the sprung mass and the unsprung mass of the vehicle regardless of the load carried by the vehicle. This also maintains and controls a predetermined road clearance for the vehicle.

Admission of air to the air spring bellows and exhaust of air from the air spring bellows is under control of a height control device, or valve, that responds to a change in clearance height between the sprung mass and the unsprung mass to admit fluid, or air, under pressure into the air spring when the load in the vehicle increases or exhausts air from the air spring when the load in the vehicle decreases.

However, in systems of the aforementioned type there is no provision for establishing a road clearance for the vehicle that is any different from that normally established by the height control device. Thus a vehicle having low road clearance may get hung up on a road having deep ruts, or may get hung up on a grease rack that is designed for a vehicle having a much higher road clearance, and no change in load in the vehicle will make any change in the road clearance for the vehicle since the height control device tends to maintain a predetermined clearance height between the sprung mass and the unsprung mass regardless of the load condition of the vehicle.

It is therefore an object of this invention to provide a control that will over-ride or bypass the height control device so that the operator of the vehicle can effect an increase in the clearance height between the sprung mass and the unsprung mass of the vehicle and thereby provide a greater than normal road clearance for the vehicle.

To accomplish the aforementioned object a control device that is under control of the operator of the vehicle is provided to effect delivery of high pressure air from a source of fluid pressure to the air spring in a manner that the normal height control valve will have no effect in regulating the clearance height between the sprung mass and the unsprung mass of the vehicle. The operator of the vehicle can provided for delivery of air into the air spring until a desired increase in clearance height between the sprung mass and the unsprung mass is occasioned to effect the desired increase in road clearance. Such a control device may provide for delivery of high presure air into the exhaust line from the air spring so that the normally closed exhaust valve in the height control device will be opened by the reverse flow of air in the exhaust line and thereby effect an increase of air pressure in the air spring directly from the high pressure source that in effect bypasses or over-rides the height control device.

To avoid extremely high pressures being delivered into the air spring directly from a high pressure source, a pressure regulating valve is placed between the high pressure source and the height control valves for the air spring so that at all times there will be a maximum air pressure deliverable to the air springs through the height control valve regardless of whether the height control valve is functioning normally to maintain a predetermined clearance height between the sprung mass and the unsprung mass or whether the regulated air pressure is being supplied to the height control valve in an over-ride operation under control of the operator of the vehicle through the auxiliary control device.

In performing the aforementioned objects, it is also another object of the invention to provide a resistance in the exhaust line from the height control valve that will prevent a sudden dropping of the vehicle after the operator has occasioned a temporary increase in the normal clearance height between the sprung mass and the unsprung mass. Since at this time the height control valve will be in a position to provide for full and complete exhausting of air from the air spring to overcome the effect of the over-ride control, and normally would permit a rapid exhaust of air from the air spring which would tend to allow a sudden drop of the vehicle to the predetermined clearance height at which the valve would take over control, the resistance provided in the exhaust line from the air valve will retard this sudden dropping of the car and thereby overcome an uncomfortable falling feeling to the passengers of the vehicle.

Further objects and advantages of the present invention will be apparent from the following description, reference being had to the accompanying drawings wherein a preferred form of the invention is clearly shown.

In the drawings:

Figure 1 is a schematic illustration of a fluid suspension system on a vehicle.

Figure 5 is a cross sectional view taken along line 5—5 of Figure 2.

Figure 6 is an elevational view of the control shown in cross section in Figure 2.

Figure 2:
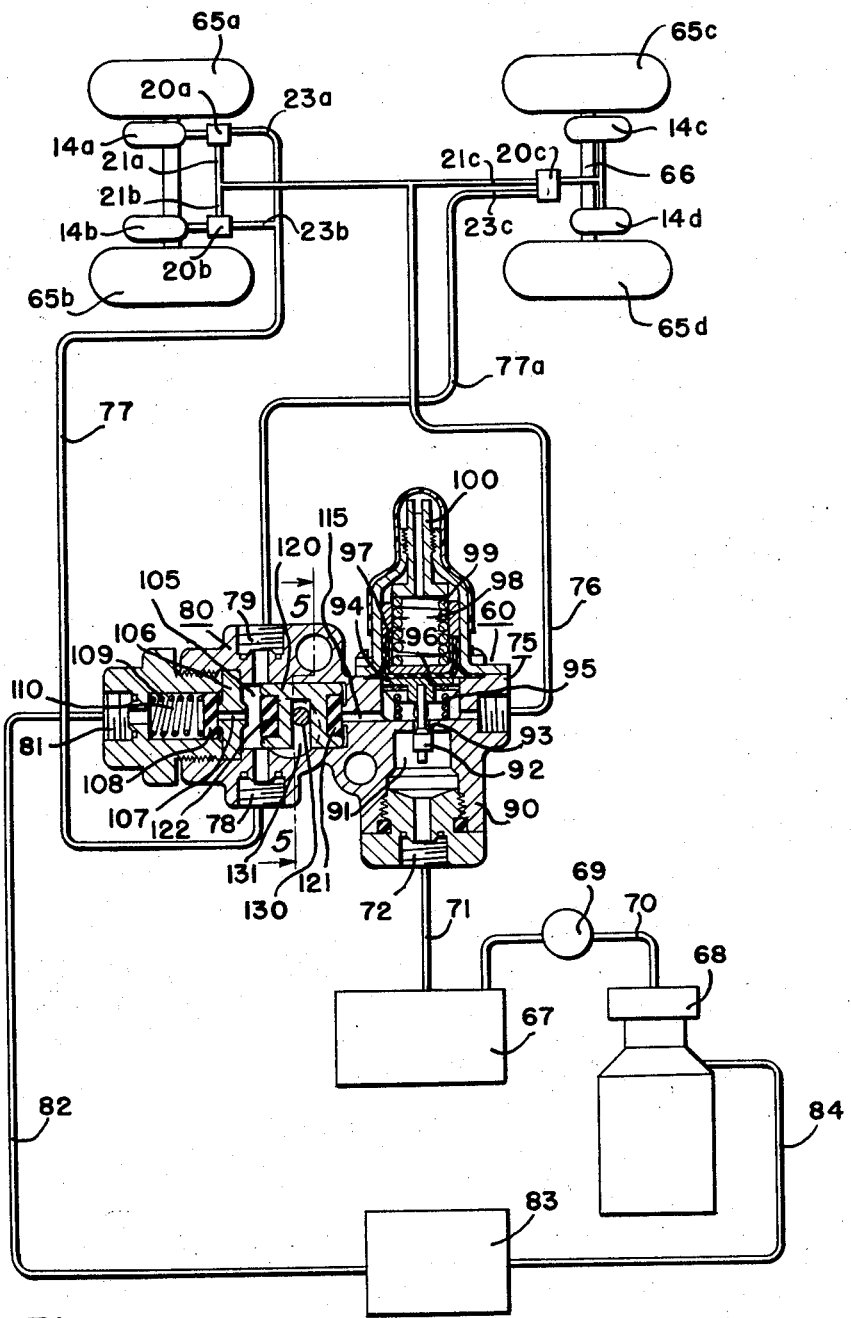
Figure 2 is a schematic illustration of the fluid suspension and controls for the same which includes a cross sectional view of one of the controls.

A fluid suspension system that may incorporate the features of this invention is schematically illustrated in Figure 1 wherein there is illustrated a chassis 10 carried upon an axle 11 that supports the wheel 12. A cross member 13 supports a bellows 14 that has the upper end thereof supported on the chassis 10. The bellows 14 contains air under pressure and therefore resiliently supports the chassis 10 on the axle 11. Drag links 15 connect the axle 11 with the chassis 10. A shock absorber 16 of any conventional type is placed between the cross arm 13 and the chassis 10.

The axle 11 and the chassis 10 are held in a predetermined clearance height relation by the pressure of the air contained within the bellows 14, the air delivered to the bellows 14 or exhausted therefrom being under control of a height control valve 20 that is secured to the chassis of the vehicle. The height control valve has an air pressure inlet line 21 through which air under pressure is supplied from a suitable source of supply. The air under pressure is delivered through the line 22 into the bellows 14. An exhaust line 23 provides for exhaust of air from the bellows 14.

The control valve 20 is connected with the axle 11 by a link 24a that connects the axle with the actuating arm 24 of the control valve 20.

In operation, the pressure of the air in the bellows 14 maintains a predetermined clearance height between the chassis 10 and the axle 11 under static load conditions. When the load in the vehicle increases the valve 20 will be actuated by the arm 24 to permit entry of high pressure air into the bellows 14 and thereby compensate for the increased load by raising the pressure of the air in the bellows 14 until the arm 24 of the control valve 20 returns to a normal neutral position. When the load of the vehicle is thereafter lightened as by discharge of passengers, the vehicle chassis 10 tends to rise relative to the axle 11 as a result of the high pressure now existing in the bellows 14. The control valve 20 will thereafter operate to exhaust some of the air pressure from the bellows 14 through the exhaust line 23 until the control arm 24 again returns to a neutral position at which there is a predetermined clearance height between the chassis 10 and the axle 11.

Figure 3:
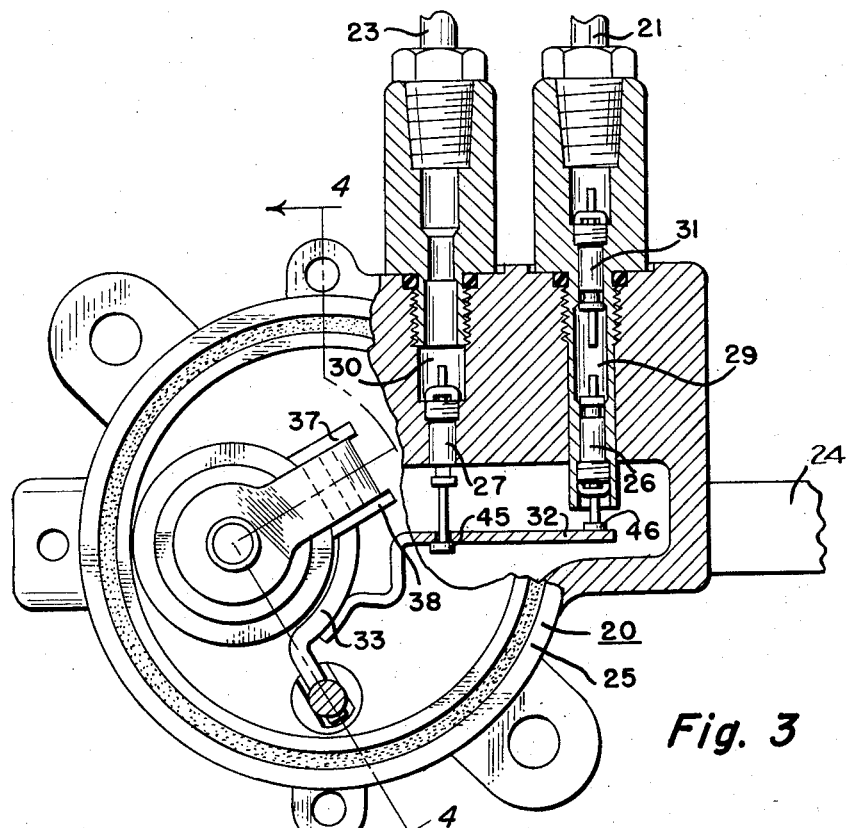
Figure 3 is a cross sectional view of a height control valve for regulating admission and exhaust of air to and from the air spring.
Figure 4:
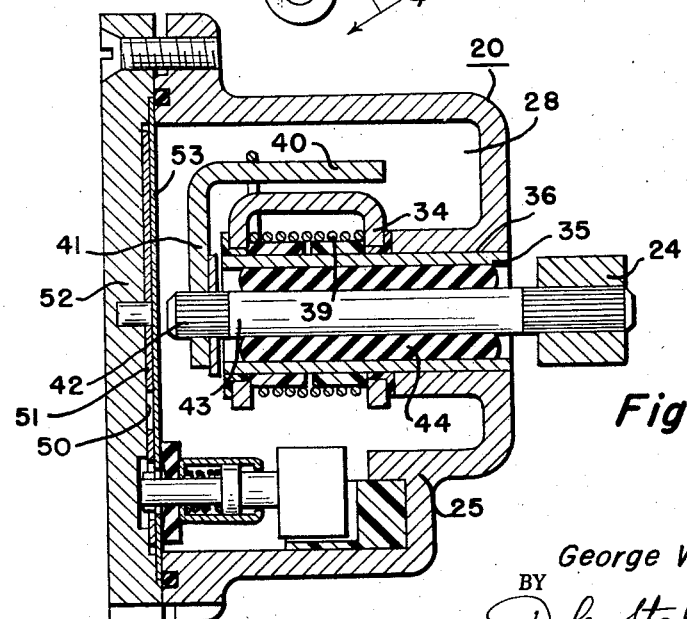
Figure 4 is a cross sectional view taken along line 4—4 of Figure 3.

A height control valve that will perform the operation heretofore described is more particularly illustrated in Figures 3 and 4. The control valve 20 consists of a body 25 having an inlet valve 26 and an exhaust valve 27 that provide for admission of air or exhaust of air from the chamber 28. The valves 26 and 27 are of a conventional Schraeder tire valve type construction. The valve 26 is located in an air inlet passage 29 that connects with the inlet pipe 21 that communicates with a source of fluid under pressure. The exhaust valve 27 is located in a passage 30 that communicates with the exhaust pipe 23.

A check valve 31 is provided in the inlet passage 29 that permits flow of air under pressure into the chamber 28 but resists flow in the opposite direction. The check valve 31 thus prevents cross flow of air between height control valves used on the vehicle, when more than one valve is used as hereinafter described and disclosed in Figure 2. The valves 26 and 27 are operated by an arm 32 that is secured to an operating arm 33 that has one end in the form of a U-shaped member 34 supported on the stationary sleeve 35 secured in the bore 36 provided in the body 25 of the valve 20. The arm 34 is thus free to rotate on the sleeve 35. Opposite ends 37 and 38 of a torsion spring 39 engage opposite sides of the U-shaped member 34 and also engage opposite sides of an arm 40 that has the extension 41 secured to the spline 42 of the shaft 43 that rotates in the rubber-like resilient bearing 44 supported in the sleeve 35. When the arm 40 oscillates with the shaft 43 the ends 37 and 38 of the torsion spring 39 will cause alternate rotation of the operating arm 33 and thereby cause the up and down movement of the arm 32 to operate the valves 26 and 27. It will be noted that the valve 27 has the head 45 thereof positioned beneath the arm 32 whereas the head 46 of the valve 26 is positioned above the arm 32 whereby the valve 27 is opened on downward movement of the arm 32 to permit exhaust of fluid from the chamber 28, whereas upward movement of the arm 32 will open the valve 26 to allow admission of fluid under pressure from the inlet line 21.

A movement damping device 50 consisting of a disk 51 operating between the cover plate 52 and a plate 53 retards movement of the operating arm 33 and thereby prevents rapid oscillations of the axle 11 of the vehicle from continuously effecting opening and closing of the valves 26 and 27.

The shaft 43 carries the control arm 24 that is connected with the axle 11 of the vehicle for operation of the valve 20.

The valve 20 disclosed herein is more particularly disclosed and described in my copending application S.N. 611,320 filed Sept. 21, 1956.

The control valve 20 heretofore described in Figures 3 and 4 as shown in a schematic suspension system of Figure 1 provides for maintaining a relatively constant clearance height between the axle 11 and the chassis 10 of the vehicle, as hereinbefore described.

Because of the low road clearance currently designed into motor vehicles, it is sometimes desirable to provide for an above normal clearance height between the axle 11 and the chassis 10 and thereby increase the road clearance of the vehicle. In Figure 2 there is illustrated a control device 60 that provides for pressure regulation of fluid under pressure to the air springs of the vehicle and also provides for an override or bypassing of the control valve 20 so that the operator of the vehicle can cause the chassis 10 to rise relative to the axle 11 regardless of the operation of the height control valves 20. In the system shown in Figure 2 the air springs 14a and 14b are controlled by the height control valves 20a and 20b respectively, these springs and valves being located at the rear wheels 65a and 65b. A single control valve 20c regulates the fluid pressure to and from the two front air springs 14c and 14d located adjacent the front wheels 65c and 65d respectively. The control valves 20a and 20b respond to the clearance height between the chassis 10 and the axle 11 on the left and right hand sides of the vehicle whereas the valve 20c responds to the clearance height between the chassis 10 and the torque rod 66 at the front of the vehicle. The control valves 20a, 20b and 20c are supplied with fluid under pressure from a pressure source or supply reservoir 67 that in turn is maintained under pressure by the compressor 68 suitably driven by the engine of the vehicle, or electrically driven. A check valve 69 is placed in the compressor line 70 between the compressor 68 and the high pressure tank 67 to prevent loss of air back to the air compressor in the event of damage to the air line or to the compressor, and to prevent leakage back through the compressor at all times.

The high pressure reservoir 67 is connected by the line 71 with the inlet port 72 of the control device 60. The control device 60 includes a pressure regulator 75 so that fluid pressure will discharge from the pressure regulator 75 at a predetermined regulated pressure into the line 76 that in turn supplies the control valves 20a, 20b and 20c with regulated fluid pressure through their respective inlet lines 21a, 21b and 21c. The exhaust lines 23a and 23b of the control valves 20a and 20b connect through the line 77 with a port 78 of an operator operated valve 80. Similarly the exhaust line 23c of the valve 20c communicates with a port 79 of the valve 80. The valve 80 has an exhaust port 81 that connects by way of the line 82 with a low pressure reservoir tank 83 from which the compressor 68 obtains its air supply through the line 84.

The control device 60, and specifically the pressure regulator 75 consists of a body 90 having a chamber 91 communicating with the inlet port 72. A valve element 92 seats in a passage 93 that connects the chamber 91 with a chamber 94. A spring 95 normally holds the valve 92 on its seat in the passage 93 to close passage 93.

The spring 95 engages an enlarged head 96 on the stem of the valve 92 which in turn engages a diaphragm 97 that is engaged by a piston member 98. The piston member 98 has an internal spring 99 urging the piston downwardly against the head 96 to open the valve 92. An adjusting screw 100 regulates the compression of spring 99.

Since the compression of spring 99 overcomes the compression of spring 95, the valve 92 will be lifted off its seat in the passage 93 until the pressure in the chamber 94 is sufficient to cause upward movement of the piston 98 against the spring 99 and thereby seat the valve 92 in its passage 93 to close off chamber 91 from chamber 94. Thus the maximum air pressure in chamber 94 is regulated by operation of the valve 92 so that air pressure in the pipe line 76 going to the height control valves 20a, 20b and 20c will always be at a maximum regulated pressure that is less than the maximum pressure of the pressure reservoir 67.

Thus at no time can the air pressure in the air springs 14a, 14b, 14c, 14d be greater than a predetermined controlled and regulated pressure as controlled by the pressure regulator 75 which will thereby prevent over-pressurizing the air springs beyond their designed limits.

The valve 80 has a chamber 105 with which the ports 79 and 78 communicate. One end of the chamber 105 is closed by a wall 106 having a port 107 therein that is closed by a valve element 108 held on its seat by a compression spring 109, the chamber 110 containing spring 109 and valve element 108 and communicating with the exhaust port 81. Thus the valve element 108 restricts the flow of air from the air springs in its passage through the chamber 105 to the exhaust port 81.

The chamber 105 communicates by way of a passage 115 with the chamber 94 of the pressure regulator 75 so that regulated air pressure can be delivered into the chamber 105 and thus through the exhaust lines 77 and 77a to the control valves 20a, 20b and 20c respectively.

Connection of the chamber 94 of the pressure regulator 75 with the chamber 105 of the valve device 80 is controlled by a valve member 120 that is slidably disposed in the chamber 105. The valve member 120 has a valve element 121 at one end that closes the passage 115 and a second valve element 122 that closes the passage 107 depending upon whether the valve is in the position shown in Figure 2 or is in a position at the opposite end of the chamber 105. The valve member is octagonal in cross sectional contour, as shown in Figure 5 so that when the valve element 121 opens the passage 115 regulated air pressure can pass from the chamber 94 of the pressure regulator 75 around the valve member 120 to the ports 78 and 79 and thereby into the exhaust lines connected with the height control valves.

The valve member 120 is under control of the operator of the vehicle by means of a lever 125 that may be connected by a flexible cable to a lever or pull button on the dash of the vehicle. The lever 125 is carried on the end of a rotating cylindrical member 126 supported in the body of the member 80, as shown in Figure 5, a retaining ring 127 holding the cylindrical member 126 in the body. An off-center pin 130 extends into a slot 131 in the valve member 120 so that rotation of the member 126 by the lever 125 will cause movement of the valve member 120 in an end-wise direction between the position shown in Figure 2 and that at the opposite end of the chamber 105.

The manually operated valve device 80 controls connection of the air springs with the exhaust line 82 for direct delivery of the exhaust air from the air springs into the low pressure tank 83 or connection of the air springs with the regulated pressure in the regulated pressure chamber 94 of the pressure regulator 75. When the valve 120 is in the position illustrated in Figure 2 air exhausted from the air springs under control of the height control valves will flow directly to the low pressure tank 83 and the air suspension system will operate in the manner heretofore described to maintain a predetermined clearance height between the chassis 10 and the axle 11 of the vehicle.

However, when the operator of the vehicle desires an above normal clearance height to be established between the chassis 10 and the axle 11 of the vehicle, the operator can actuate the lever 125 to rotate the pin 121 about the axis of the cylinder 126 and shift the valve member 120 from the position illustrated in Figure 2 to that position wherein the passage 107 is closed by the valve element 122. When this occurs, regulated fluid pressure will pass from the chamber 94 of the pressure regulator 75 through the passage 115 and around the valve element 120 into the ports 78 and 79 of the member 80 and thence into the exhaust lines 77 and 77a that connects with the exhaust ports 23a, 23b, and 23c of the respective height control valves 20a, 20b, and 20c. Since the exhaust valve 27 in the height control valves can be opened by a flow of air in a reverse direction to that normally occasioned by exhaust of air from the chamber 28 of the control valve 20, the high pressure air passing into the exhaust lines will thereby enter the chamber 28 of the control valve and pass through the pipe line 24 into the air springs controlled by the respective control valves to effect an increase in pressure in the respective air springs and thereby increase the clearance height between the axle and chassis of the vehicle, as well as the road clearance. The maximum air pressure that is deliverable into the air springs under this condition of operation is that established by the pressure regulator 75 in the chamber 94. Thus the air springs cannot be over-pressurized beyond that for which they are designed.

Since under the previous condition of operation the exhaust valve 27 will be opened wide because of the above normal clearance height between the axle and chassis of the vehicle, if the valve 80 were suddenly shifted back to the position shown in Figure 2, the air would exhaust rapidly out of the air springs and give the passengers of the vehicle a falling sensation. To prevent this, the resistance valve 108 is placed in the exhaust system to slow down the exhaust flow of air from the air springs until such time as the control valve 27 of the valve 20 is again able to take over regulated control of the exhaust of air from the respective air springs.

While the form of embodiment of the invention as herein disclosed constitutes a preferred form, it is to be understood that other forms might be adopted as may come within the scope of the claims which follow.

What is claimed is as follows.

1. In a fluid suspension system for controlling the clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulation means controlling pressure of the fluid supplied from said source to said height control means, and an additional fluid control means under control of the operator of the vehicle effective to override the effect of the height control means to deliver regulated pressure fluid from said fluid pressure regulation means to said spring and effect thereby an above normal clearance height between the sprung mass and the unsprung mass.

2. In a fluid suspension system for controlling the clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulation means controlling pressure of the fluid supplied from said source to said height control means, and an additional control means under control of the operator of the vehicle effective to deliver regulated fluid pressure from said source to the exhaust side of said height control means for delivery of controlled fluid pressure to said spring therethrough and effect thereby an above normal clearance height between the sprung mass and the unsprung mass.

3. In a fluid suspension system for controlling the clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulation means controlling pressure of the fluid supplied from said source to said height control means, and an additional fluid control means under control of the operator of the vehicle effective to override the effect of the height control means to deliver regulated fluid pressure from said fluid pressure regulation means to the exhaust side of said height control means and thereby to said spring and effect thereby an above normal clearance height between the sprung mass and the unsprung mass.

4. In a fluid suspension system for controlling clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulating means controlling pressure of the fluid supplied from said source to said height control means, and an additional control means under control of the operator of the vehicle having one position providing for exhaust of fluid from said spring and a second position to provide for delivery of regulated fluid pressure from said pressure regulating means to said spring through the exhaust side of said height control means whereby to effect an above normal clearance height between the sprung mass and the unsprung mass.

5. In a fluid suspension system for controlling clearance height between the sprung mass and the unsprung mass of a vehicle, a fluid spring positioned between an unsprung mass and a sprung mass of a vehicle, a fluid pressure source, a height control means responsive to changes in clearance height between the unsprung mass and the sprung mass of the vehicle and having first valve means to control inlet of fluid under pressure into said spring and second valve means to control exhaust of fluid from said spring as actuated by the control means acting in response to a change in clearance height between the sprung mass and the unsprung mass, fluid pressure regulation means between said source and said height control means controlling pressure of the fluid supplied from said source to said height control means, and an additional control means under control of the operator of the vehicle between said height control means and exhaust having one position providing for exhaust of fluid from said spring and a second position providing for delivery of regulated pressure fluid from said pressure regulation means to said spring through the exhaust side of said height control means whereby to effect an above normal clearance height between the sprung mass and the unsprung mass.

6. In a fluid suspension system for controlling clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass for controlling supply of fluid from said source to said spring and exhaust of fluid from said spring and having a first valve means urged to close to prevent inlet of fluid under pressure into the spring and second valve means urged to close to prevent exhaust of fluid from said spring until actuated by the control means acting in response to a change in clearance height between the sprung mass and the unsprung mass whereby to maintain a normal predetermined clearance height between the sprung mass and the unsprung mass, fluid pressure regulating means between said source and said height control means controlling pressure of the fluid supplied from said source to said first valve means, and an additional control means under control of the operator of the vehicle between said height control means and exhaust having one position providing for exhaust of fluid from said spring and a second position providing for delivery of regulated fluid pressure from said pressure regulating means to said second valve means to open the same and effect thereby an above normal clearance height between the sprung mass and the unsprung mass.

7. In a fluid suspension system for controlling clearance height between the unsprung mass and the sprung mass of a vehicle, a fluid spring positioned between an unsprung mass and a sprung mass of a vehicle, a fluid pressure source, height control means responsive to changes in clearance height between the unsprung mass and the sprung mass controlling supply of fluid from said source to said spring and exhaust of fluid from said spring and having first valve means urged to a normally closed position to prevent inlet of fluid under pressure into said spring and second valve means urged normally to a closed position to prevent exhaust of fluid from said spring until actuated by the control means acting in response to a change in clearance height between the sprung mass and the unsprung mass to maintain thereby a normal predetermined clearance height between the sprung mass and the unsprung mass, fluid pressure regulating means disposed in conduit means connecting said source with said first valve means to control pressure of the fluid supplied from said source to said first valve means, an additional control means positioned in conduit means connecting said second valve means with exhaust, conduit means providing fluid connection between said additional control means and the regulated pressure side of said pressure regulating means for supply of regulated fluid pressure to said additional control means, and valve means in said additional control means having one position closing off said fluid connection between said additional control means and said pressure regulating means and providing for flow of fluid from said second valve means of said height control means to exhaust and a second position closing off connection of said second valve means of said height control means with exhaust and provide for delivery of regulated fluid pressure from said pressure regulated means to said second valve means of said height control means to open the same and effect thereby a change in clearance height between the sprung mass and the unsprung mass.

8. In a fluid suspension system for controlling clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulating means controlling pressure of the fluid supplied from said source to said height control means, and an additional control means under control of the operator of the vehicle having one position providing for restricted flow of fluid from said spring to exhaust and a second position closing off said restricted flow and connecting regulated fluid pressure from said pressure regulating means with said height control means to effect an operator controlled change in clearance height between the sprung mass and the unsprung mass.

9. In a fluid suspension system for controlling clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulating means controlling pressure of the fluid supplied from said source to said height control means, and an additional control means under control of the operator of the vehicle having one position providing for restricted flow of fluid from said spring to exhaust and a second position closing off said restricted flow and connecting regulated fluid pressure from said pressure regulating means with said spring through the exhaust side of said height control means to effect an operator controlled change in clearance height between the sprung mass and the unsprung mass.

10. In a fluid suspension system for controlling clearance height between the unsprung mass and the sprung mass of a vehicle, a fluid spring positioned between an unsprung mass and a sprung mass of a vehicle, a fluid pressure source, a height control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, fluid pressure regulating means controlling pressure of the fluid suppled from said source to said height control means, and an additional control means under control of the operator of the vehicle having one position providing for restricted flow of fluid through pressure control valve means which maintains a predetermined pressure value in exhaust conduit means between said additional control means and said height control means and a second position closing off said restricted flow through said exhaust conduit means and connecting regulated fluid pressure from said pressure regulating means with said height control means to effect an operator controlled change in clearance height between the sprung mass and the unsprung mass.

11. In a fluid suspension system for controlling clearance height between the unsprung mass and the sprung mass of a vehicle in which a fluid spring is positioned between the unsprung mass and the sprung mass of the vehicle with a height control means that is responsive to changes in clearance height between the unsprung mass and the sprung mass controlling supply of fluid under pressure from a fluid pressure source to the spring and exhausting of fluid from the spring to maintain a normal predetermined clearance height between the sprung mass and the unsprung mass, an additional control means controlled by the operator of the vehicle and positioned between said height control means and said source of fluid pressure and exhaust, comprising, pressure regulating valve means having a chamber receiving fluid at regulated pressure adapted for delivery to said height control means, means forming a second chamber adapted to receive exhaust fluid from said height control means, fluid passage means providing for exhaust of fluid from said second chamber, means forming a fluid passage connecting said second chamber with said first chamber, and valve means in said second chamber operated under control of the operator of the vehicle having one position closing said passage means between said second chamber and said first chamber with said exhaust passage open and a second position closing said exhaust passage and opening said passage between said second chamber and said first chamber for supply of regulated pressure fluid from said first chamber into said second chamber and thereby to the exhaust conduit connecting said second chamber with said height control means.

12. In a fluid suspension system for controlling clearance height between the unsprung mass and the sprung mass of a vehicle in which a fluid spring is positioned between the unsprung mass and the sprung mass of the vehicle with a height control means that is responsive to changes in clearance height between the unsprung mass and the sprung mass controlling supply of fluid under pressure from a fluid pressure source to the spring and exhausting of fluid from the spring to maintain a normal predetermined clearance height between the sprung mass and the unsprung mass, an additional control means controlled by the operator of the vehicle and positioned between said height control means and said source of fluid pressure and exhaust, comprising, pressure regulating valve means having a chamber receiving fluid at regulated pressure adapted for delivery to said height control means, means forming a second chamber adapted to receive exhaust fluid from said height control means, fluid passage means providing for exhaust of fluid from said second chamber, resiliently acting valve means restricting flow of fluid through said passage means, means forming a fluid passage connecting said second chamber with said first chamber, and valve means in said second chamber operated under control of the operator of the vehicle having one position closing said passage means between said second chamber and said first chamber with said exhaust passage open and a second position closing said exhaust passage and opening said passage between said second chamber and said first chamber for supply of regulated pressure fluid from said first chamber into said second chamber and thereby to the exhaust conduit connecting said second chamber with said height control means.

13. For use in a fluid suspension system having a fluid spring positioned between a sprung mass and an unsprung mass of a vehicle using fluid under pressure from a pressure source connected by conduits with a height control means responsive to changes in clearance height to effect supply and exhaust of fluid relative to the spring to maintain a predetermined clearance height between the sprung and unsprung masses, a control means that in effect bypasses and over-rides the height control means, comprising, a body having a space therein adapted to communicate with passages leading to both the supply and exhaust conduits of the height control means and the conduit from the pressure source, a pressure regulating valve means in said body normally opening the passage from the pressure source to the space inside the body and closing the passage from the pressure source in response to predetermined maximum fluid pressure thereby protecting the air spring against fluid pressure in excess of the predetermined maximum pressure, a shiftable valve element located within said body normally in a position blocking the exhaust passage from the space that communicates with the passage from the pressure source and movable to another position connecting the passage from the pressure source through the space to the exhaust passage, and means manually operable to shift said valve element to the latter position for effecting increase in pressure in the fluid spring to raise the sprung mass beyond the predetermined clearance height relative to the unsprung mass temporarily irrespective of vehicle loading for establishing clearance different from that normally established by the height control device.

14. A control means that in effect bypasses and over-rides a height control means governing supply and exhaust of fluid under pressure from a pressure source to maintain a predetermined normal clearance height using fluid under pressure in a fluid spring between sprung and unsprung masses of a vehicle, comprising, means forming passages for communication with the pressure source and for communication with both exhaust and supply of the height control means, pressure regulating valve means provided with said bypass and over-ride control means, said pressure regulating valve means having a chamber for delivery of fluid from the source normally to the supply passage and normally blocked from the exhaust passage, a shiftable valve member normally blocking the exhaust passage from the pressure regulating chamber, and means manually operable to shift said valve member to a position for connecting the exhaust passage with the chamber and pressure source passage for effecting increase in pressure in the fluid spring to raise the sprung mass beyond the predetermined clearance height relative to the unsprung mass temporarily for establishing clearance height different from that normally established by the height control means through operation of said bypass and over-ride control means.

15. A control means that in effect bypasses and over-rides a height control means governing supply and exhaust of fluid under pressure from a pressure source to maintain a predetermined clearance height using fluid under pressure in a fluid spring between sprung and unsprung masses of a vehicle, comprising, means forming a chamber and passages therefrom for communication with the pressure source and for communication with both exhaust and supply of the height control means, pressure regulating valve means adjacent the chamber and having a valve element capable of blocking the pressure source passage when the pressure exceeds a predetermined maximum pressure, means forming a second chamber communicating with the exhaust passage and adapted to receive exhaust fluid from the height control means, means forming a restrictive passage from the second chamber for gradual return of the exhaust fluid back to the source, an additional valve means normally blocking the communication between the pressure source passage and exhaust passage, and means for operating said additional valve means temporarily to open the communication between the pressure source passage and exhaust passage while closing off the restrictive passage for effecting increase in pressure in the fluid spring to raise the sprung mass beyond the predetermined clearance height relative to the unsprung mass.

16. A control means that in effect bypasses and over-rides a height control means governing supply and exhaust of fluid under pressure from a pressure source to maintain a predetermined clearance height using fluid under pressure in a fluid spring between sprung and unsprung masses of a vehicle, comprising, means forming a chamber and passages therefrom for communication with the pressure source and for communication with both exhaust and supply of the height control means, pressure regulating valve means adjacent the chamber including a resiliently urged piston on one side of a diaphragm in the chamber and a resiliently urged valve element on the opposite side of said diaphragm, said valve element being movable to close the pressure source passage in response to a fluid pressure in excess of a predetermined maximum pressure in the chamber causing movement of said diaphragm against said piston, means forming a second chamber communicating with the exhaust passage and adapted to receive exhaust fluid from the height control means, means forming a restrictive passage from the second chamber back to the source, an additional valve means normally blocking the communication between the pressure source passage and exhaust passage, and means for operating said additional valve means temporarily to connect the fluid pressure passage through the first mentioned chamber to the exhaust passage while said additional valve means temporarily closes off the restrictive passage to effect temporary increase in clearance height between the sprung and unsprung masses by supply of fluid under pressure to the fluid spring through the exhaust passage from the fluid pressure source passage.

17. In the control means of claim 16, an adjusting means journalled adjacent said resiliently urged piston, said adjusting means including a threaded member rotatable to adjust compression of a spring relative to said piston for setting the force on said diaphragm with said pressure regulating valve means to be responsive to any predetermined maximum fluid pressure from the source.

References Cited in the file of this patent

UNITED STATES PATENTS

| 820,707 | Downer | May 15, 1906 |
| 2,644,699 | Weiertz | July 7, 1953 |
| 2,762,633 | Gouirand | Sept. 11, 1956 |